US012779481B2

(12) United States Patent
Belgiovine et al.

(10) Patent No.: US 12,779,481 B2
(45) Date of Patent: Nov. 3, 2026

(54) FEEDING UNIT AND A POWDERING STATION COMPRISING SUCH A FEEDING UNIT

(71) Applicant: EXEL INDUSTRIES, Epernay (FR)

(72) Inventors: Adrien Belgiovine, Epernay (FR); Maxime Perrier, Epernay (FR); Eric Ghio, Epernay (FR); Hervé Brochier-Cendre, Epernay (FR)

(73) Assignee: EXEL INDUSTRIES, Epernay (FR)

( * ) Notice: Subject to any disclaimer, the term of this patent is extended or adjusted under 35 U.S.C. 154(b) by 444 days.

(21) Appl. No.: 18/525,848

(22) Filed: Dec. 1, 2023

(65) Prior Publication Data

US 2024/0189845 A1 Jun. 13, 2024

(30) Foreign Application Priority Data

Dec. 7, 2022 (FR) ...................................... 2212911

(51) Int. Cl.
*B05B 7/14* (2006.01)

(52) U.S. Cl.
CPC .......... *B05B 7/1472* (2013.01); *B05B 7/1463* (2013.01)

(58) Field of Classification Search
USPC .................................................. 118/308, 309
See application file for complete search history.

(56) References Cited

U.S. PATENT DOCUMENTS

| | | | |
|---|---|---|---|
| 7,074,274 B1 | 7/2006 | Shutic et al. | |
| 7,325,750 B2 | 2/2008 | Shutic et al. | |
| 2007/0235558 A1 | 10/2007 | Ballu et al. | |
| 2019/0314836 A1 | 10/2019 | Lutz et al. | |

FOREIGN PATENT DOCUMENTS

| | | | | |
|---|---|---|---|---|
| CN | 205851145 U * | 1/2017 | | |
| DE | 20220707 U1 * | 3/2004 | ............. | B05B 14/45 |
| EP | 1953098 A1 * | 8/2008 | ........... | B05B 12/004 |

OTHER PUBLICATIONS

English Translation CN-205851145-U (Year: 2017).*
English Translation DE-20220707 U1 (Year: 2004).*
English Translation EP-1953098-A1 (Year: 2008).*
FR 2212911, INPI Rapport de Recherche Preliminaire, Jun. 28, 2023, 2 pages.

* cited by examiner

*Primary Examiner* — Yewebdar T Tadesse
(74) *Attorney, Agent, or Firm* — Soquel Group LLC

(57) ABSTRACT

A feeding unit for a powdering station of powder coating product including a fluidized coating product reservoir, a support for receiving a coating product container, a pump for feeding the reservoir from the container and a casing, which defines an internal volume for receiving the reservoir and which is provided with an opening for access to the internal volume. The support is movable in rotation or circular translation about at least one axis of rotation, in both directions, between a first loading/unloading position, in which the support projects outside the internal volume of the casing, through the access opening, and a second coating product transfer position, wherein the support and a container in place on the support are included in this internal volume.

18 Claims, 8 Drawing Sheets

A)

B)

A)

B)

A)

B)

A)

B)

A)

B)

FEEDING UNIT AND A POWDERING STATION COMPRISING SUCH A FEEDING UNIT

CROSS-REFERENCE TO RELATED APPLICATION

This application claims priority of French Patent Application No. 22 12911, filed on Dec. 7, 2022.

FIELD OF THE INVENTION

The present invention relates to a feeding unit for supplying a powder coating product to a powdering station.

The technical field of the invention is that of powdering stations or installations, wherein one or more sprayers project a powder coating product onto objects to be coated. This or these sprayer(s) may be manual or automatic, in which case they are advantageously moved by a multi-axis or reciprocating robot.

BACKGROUND OF THE INVENTION

In this type of station, it is known to provide a unit or central unit for supplying the powdering station, more particularly its sprayer(s), with a powder coating product. Such a unit generally comprises a casing or envelope, installed in the vicinity of a spray booth and defining an internal volume in which a fluidized coating product reservoir is arranged. This fluidized coating product reservoir is fed by a pump which draws the powder coating product into a container placed on a support, for example, a vibrating table.

Prior art feeding units are known from US2019/314836A1, U.S. Pat. Nos. 7,074,274B1, 7,325,750B2 and US 2007/235558 A1.

The powder coating product is often available packaged in a carton or bag with a mass of the order of 20 kilograms (kg) or more. Over the course of a working day, several containers full of powder must be successively loaded onto the support, in a confined space, near the fluidized coating product reservoir, in the internal volume of the casing. When a container has been completely or partially emptied, it must be unloaded from the support and removed from this confined space, to allow another container to be fitted, for example if the color of the coating product to be sprayed changes. Depending on the powder station consumption of coating product, the loading/unloading operations of coating product containers onto the support can take place up to ten times in an eight-hour shift. These operations take place in a confined space, which is likely to lead to increased fatigue and musculoskeletal disorders for an operator.

SUMMARY OF THE DESCRIPTION

It is these problems in particular which the invention aims to remedy by proposing a new feeding unit for a powder coating station, so the powder coating product of which is easier to load.

To this end, the invention relates to a powder coating station feeding unit, this feeding unit comprising a fluidized coating product reservoir, a support for receiving a coating product container, a pump for feeding the fluidized coating product reservoir from the container carried by the support and a casing which defines an internal volume for receiving the fluidized coating product reservoir and which is provided with an access opening to this internal volume. In accordance with the invention, the support is movable in rotation or in a circular translation about at least one axis, in both directions, at least between:

- a first loading/unloading position, in which the support projects outside the internal volume of the casing, through the access opening; and
- a second coating transfer position, in which the support and a container in place on the support are included in the internal volume of the casing.

Thanks to the invention, the rotation or circular translation of the support allows this to be brought into its first position, in which it is easily accessible to an operator since it projects outside the casing, thus facilitating loading of the support with the container filled with powder coating product. This saves the operator from having to carry the coating product container into the feeding unit. This greatly reduces operator fatigue and prevents musculoskeletal disorders. The same advantages are induced when a container has to be unloaded from the support, this container may be empty or partially filled with powder coating product, particularly in the event of a color change. In the second position, the support and the container in place on this support are correctly arranged, in the internal volume of the casing, so that the pump can draw the coating product into the container. As the support and container are included in the internal volume of the casing, they do not impede the passage of operators or transport carts in the vicinity of the feeding unit, which improves the safety of the powdering station. The rotation or circular translation implemented to displace the support between its two positions presents the advantage of being a simple, well-controlled movement, which does not encumber the space outside the casing.

According to advantageous but non-mandatory aspects of the invention, such a feeding unit may incorporate one or more of the following features taken in any technically permissible combination:

- The axis of rotation is vertical and preferably arranged, in part, within the internal volume of the casing.
- The support is equipped with a vibrating table.
- The support may be moved in rotation or circular translation, from one of its first and second positions, to a third position for draining the fluidized coating product reservoir, and vice versa from the third position to one of its first and second positions.
- In the third position of the support, the coating product container is arranged below the fluidized coating product reservoir.
- An angle of rotation of the support between its first and second positions is between 100° and 180°, preferably between 120° and 160°, more preferably of the order of 135°. Preferably, an angle of rotation of the support, between its first and third positions is between 70 and 110°, preferably between 80° and 100°, still more preferably of the order of 90°.
- The container is fitted with a cover provided with a tube for passage of a coating product suction pipe when the support is in its second position, while this tube is arranged below an opening of the fluidized coating product reservoir drain when the support is in its third position.
- The support is equipped with at least one handle for moving the support in rotation between its first and second positions, and possibly between these first and second positions and the third position.
- The support is configured to receive containers of the tray type, in particular a rigid tray for a bag of coating product, or of the carton type.

According to a second aspect, the invention relates to a powdering station which includes at least one powder coating product sprayer installed in a spray booth and supplied with coating product by a supply unit as mentioned above.

Such a powdering station induces the same advantages as those mentioned above concerning the feeding unit, in particular in terms of reduced musculoskeletal disorders for the operator and safety.

BRIEF DESCRIPTION OF THE DRAWINGS

The invention will be better understood and other advantages of the invention will become clearer in the light of the following description of two embodiments of a feeding unit and a powdering station in accordance with its principle, given by way of example only and made with reference to the appended drawings in which.

DETAILED DESCRIPTION OF EMBODIMENTS

Figure 1:
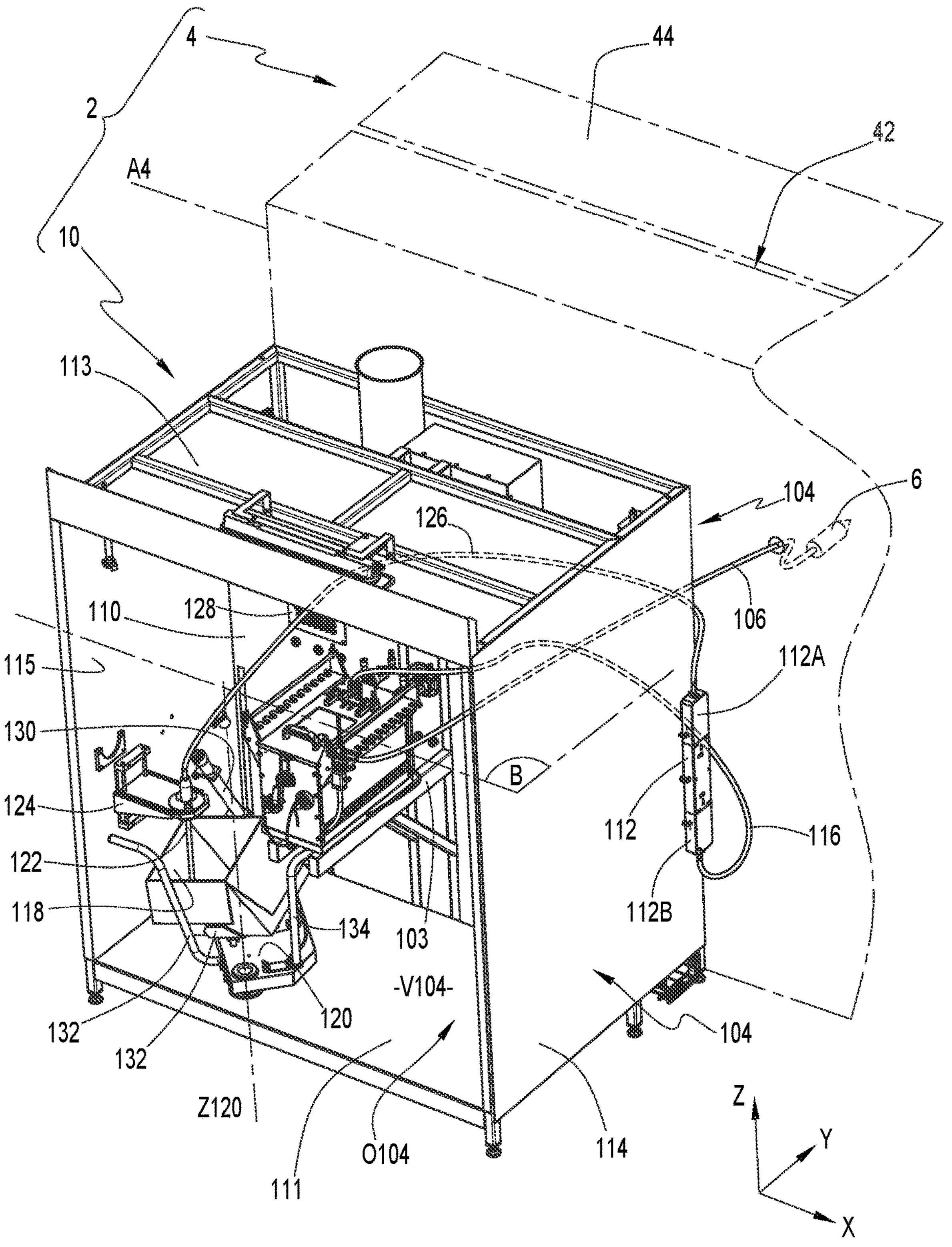
FIG. 1 is a schematic perspective view of a powdering station and feeding unit in accordance with a first embodiment of the invention.

FIG. 1 shows a powdering station or installation 2 including a spray booth 4 in which objects, not shown, are displaced according to a conveying axis A4 by a conveyor, also not shown, the hangers of which pass through a longitudinal slot 42 in a ceiling 44 of booth 4. Booth 4 contains one or more sprayers 6, only one of which is shown very schematically in FIG. 1 and is oriented toward the objects displaced by the conveyor inside cabin 4.

In the example shown in the figures, sprayer 6 is an automatic sprayer displaced by a multi-axis robot, not shown, according to the three axes X, Y, Z of an orthogonal reference frame XYZ, the axis X being parallel to the conveyor axis A4. Alternatively, the robot is of a reciprocating or other type, and sprayer 6 is displaced according to some or all of the X, Y, Z axes. According to another variant, sprayer 6 is a manual sprayer carried by a painter standing in booth 4.

Sprayer 6 may be electrostatic or triboelectric.

The number of sprayers 6 in booth 4 is adapted to its volume and to the size of the parts to be coated.

Powdering station 2 also includes a supply unit 10, which supplies each sprayer 6 with a mixture of air and powder coating product, from a reservoir 102 arranged within an internal volume V104 of a casing 104, which constitutes the outer envelope of supply unit 10 and which, in the example shown in the figures, is parallelepipedal and adjoining spray booth 4.

Unit 10 may also be referred to as a powder coating unit.

A bracket 103 supports reservoir 102 in internal volume V104, in a fixed position relative to casing 104. Reservoir 102 is thus relatively isolated from the external environment of powdering station 2 and mechanically protected against impact.

Casing 104 also has the function of limiting the diffusion of powder grains outside feed station 10.

A feed pipe 106 connects reservoir 102 to each sprayer 6.

Figure 2:
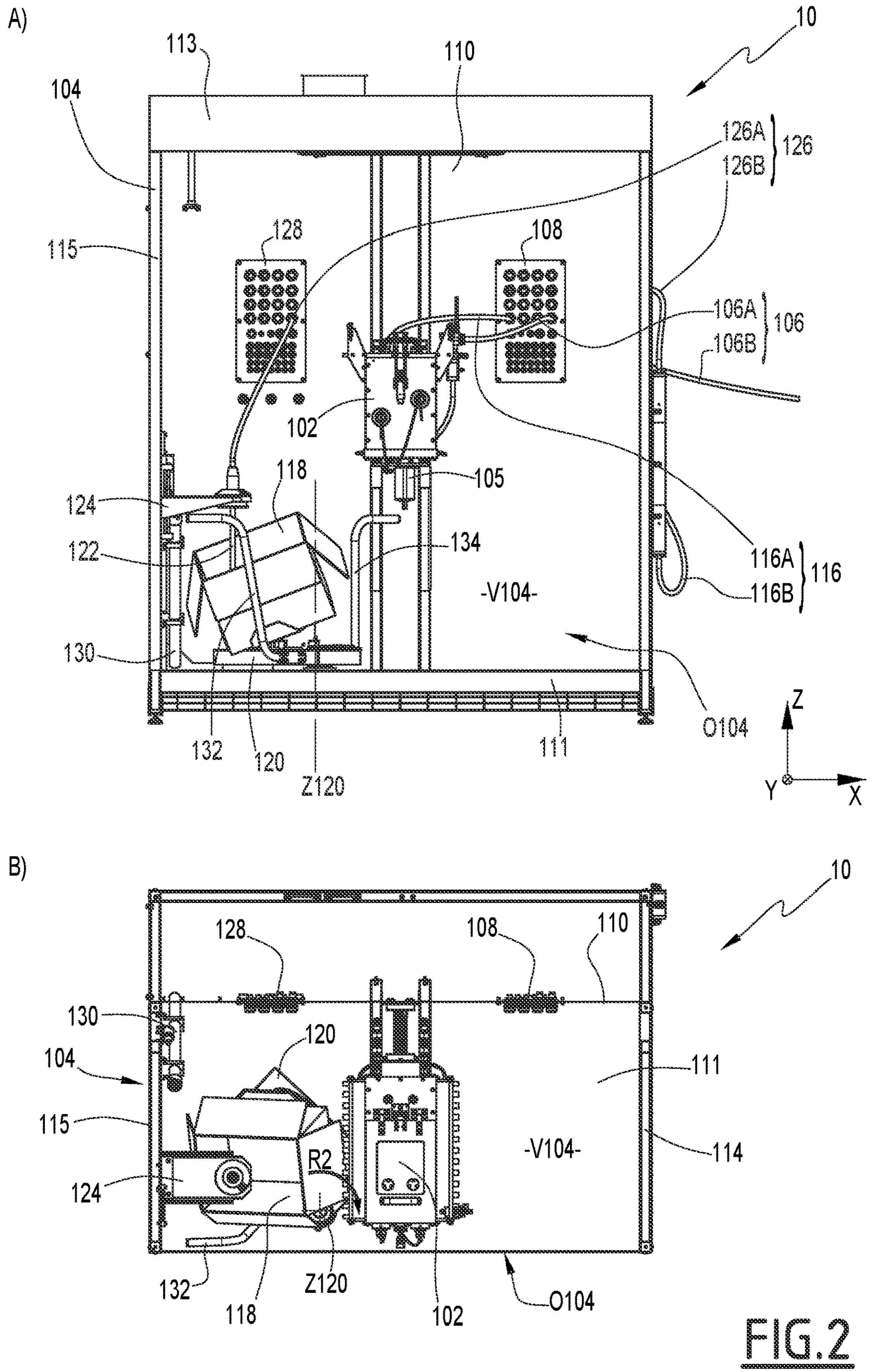
FIG. 2 shows, on two inserts A) and B), the feeding unit in front view and in vertical cross-section according to the plane B of FIG. 1, in the configuration shown in FIG. 1.
Figure 3:
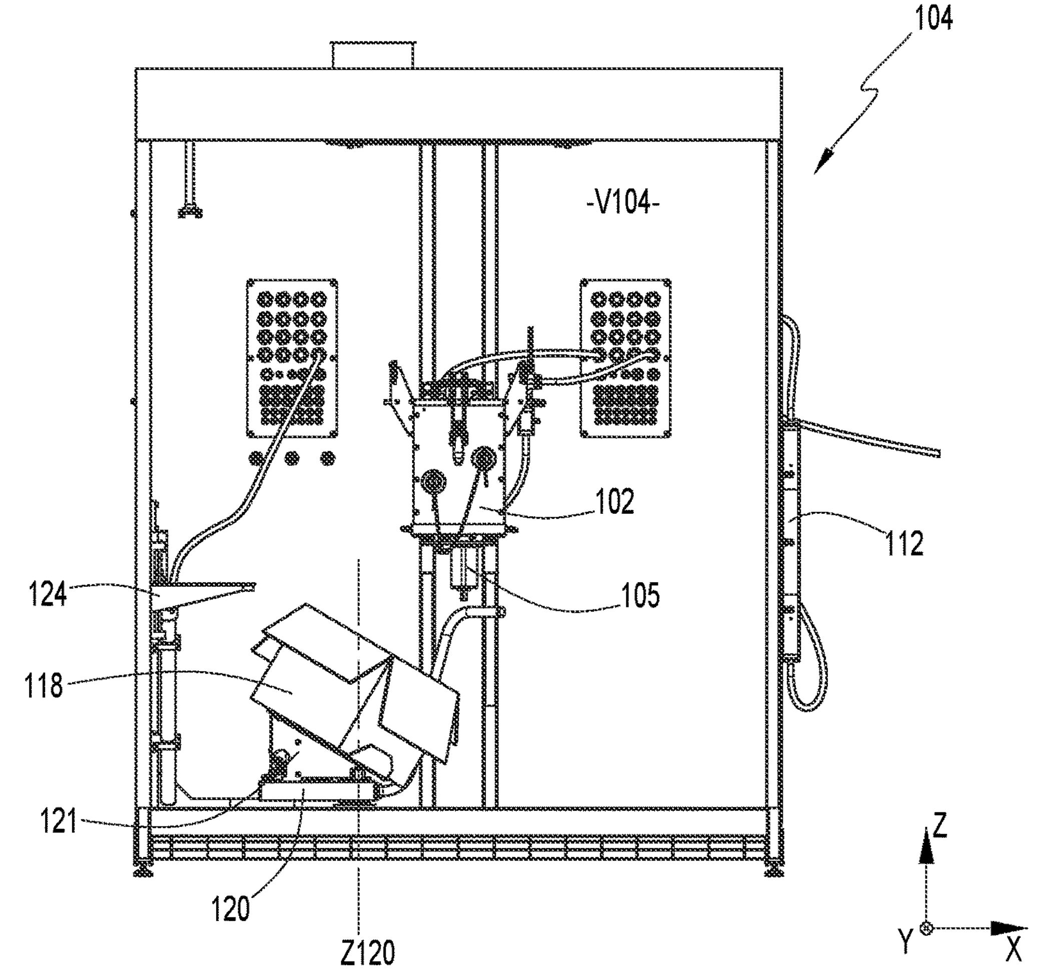
FIG. 3 is a view similar to FIG. 2, when a support of the feeding unit is in loading position.
Figure 3:
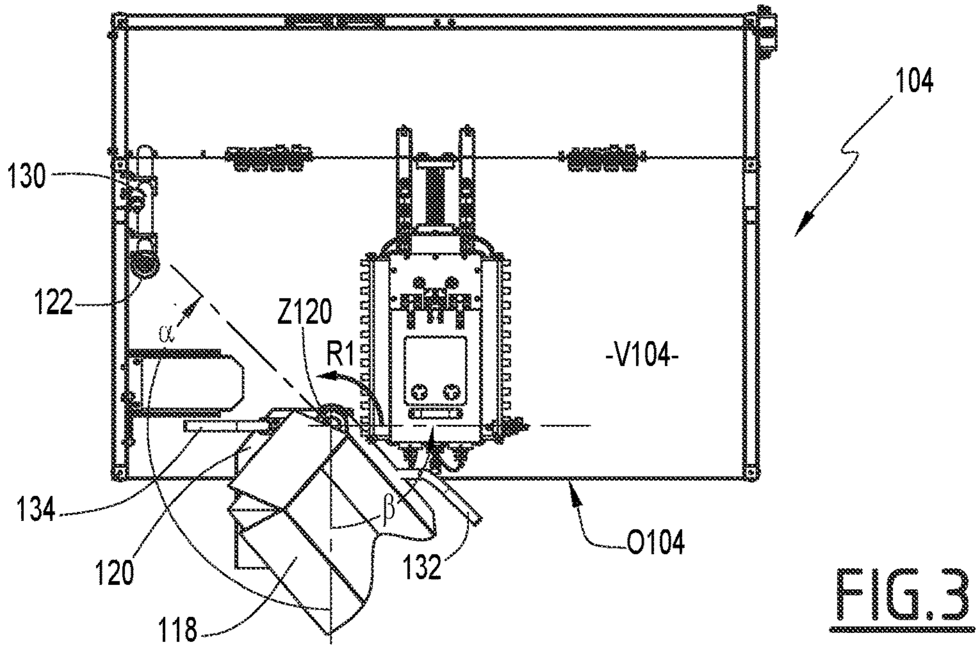
Figure 4:
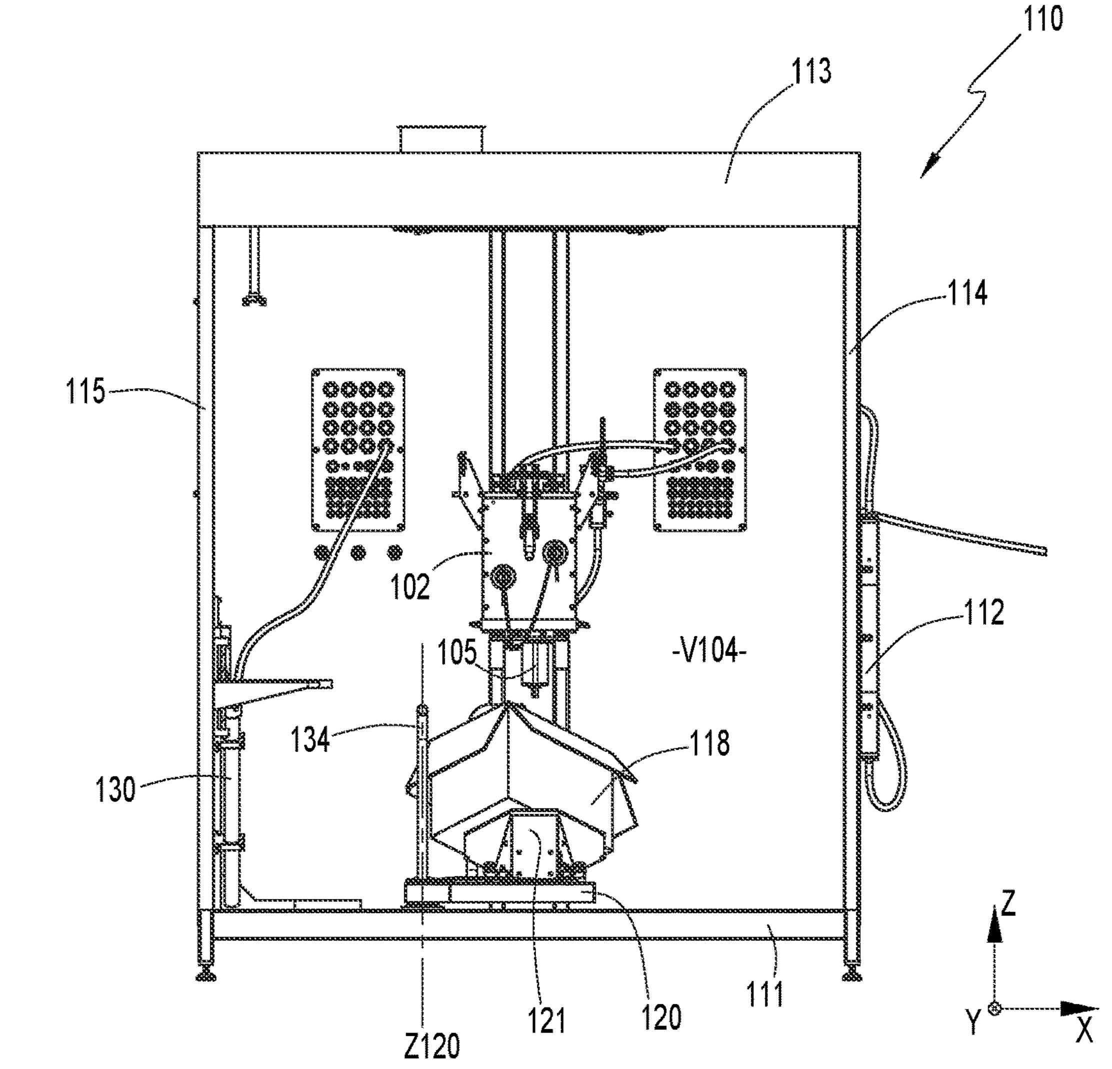
FIG. 4 is a view similar to FIG. 2, when the support of the feeding unit is in the position for draining a reservoir of fluidized coating product.
Figure 4:
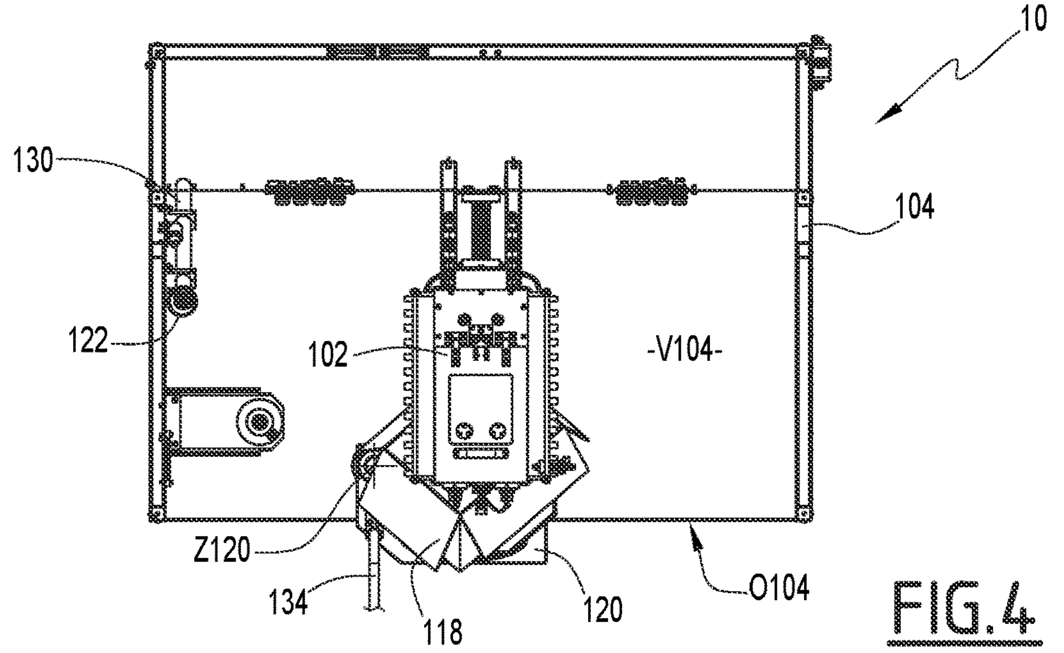

As can be seen in FIGS. 2-4, a connection plate 108 is fixed to a bottom wall 110 of casing 104, and a first part 106A of feed pipe 106 extends between reservoir 102 and plate 108, within internal volume V104, while a second part 106B of this feed pipe extends between plate 108 and sprayer 6, outside internal volume V104.

Reservoir 102 is supplied with powder coating product by a pump 112 which also belongs to supply unit 10 and is fixed to the outside of a first side wall 114 of casing 104. A second feed pipe 116 connects outlet 112B of pump 112 to reservoir 102 and includes a first part 116A which extends inside internal volume V104, between reservoir 102 and plate 108, and a second part 116B which extends between plate 108 and pump 112, outside internal volume V104.

The positioning of pump 112 shown in the figures is not limiting. Alternatively, pump 112 may be installed on the inside of side wall 114, on bottom 110, in particular on the side of this bottom facing the outside of casing 104, opposite volume V104, on floor 111, on ceiling 113 or on second side wall 115 of casing 104.

A front-rear direction of feeding unit 10 is defined as a direction parallel to axis Y and oriented in the same direction as this axis. An access opening O104 to volume 104 is defined by front edges of floor 111, ceiling 113 and side walls 114 and 115, these front edges being those visible in FIG. 1 and on insert B) of FIGS. 2-4.

Inlet 112A of pump 112 is supplied with powder coating product contained in a carton 118 arranged on a support 120.

In the configuration shown in FIG. 1, the powder coating product can be fed to sprayer 6 in fluidized form. This position is therefore a coating product transfer position, from carton 118 to reservoir 102, then from reservoir 102 to sprayer 6. In this position, support 120 and carton 118 are fully enclosed within internal volume V104 of casing 104. In other words, carton 118 and carrier 120 do not project out of volume V104 through opening O104. Carton 118 and carrier 120, which do not project outside volume V104, are unlikely to interfere with operators or transport carts moving in the vicinity of powdering station 2.

Advantageously, support 120 is equipped with a vibrating table 121 which allows carton 118 to be shaken in the configuration shown in FIGS. 1 and 2, in order to facilitate gathering of coating product in its lower corner. An upper face of vibrating table 121 is inclined and allows carton 118 to rest with an inclined configuration facilitating concentration of the coating product in a lower corner of carton 118.

In the configuration of feeding unit 10 shown in FIGS. 1 and 2, a suction tube 122 plunges into carton 118, held in place by a bracket 124 fixed to second side wall 115 of casing 104.

A third pipe 126 connects the upper end of suction tube 122 to inlet 112A of pump 112. A first part of pipe 126 extends between suction tube 122 and a connection plate 128 fixed to bottom wall 110, within internal volume V104, while a second part of this tube extends between plate 128 and pump 112 of inlet 112A, outside internal volume V104.

A sleeve 130 is arranged on the inner face of wall 115 turned toward volume V104 and configured to receive suction tube 122 when it is not in place on bracket 124 for plunging into carton 118.

For clarity of the drawing, pipes 106, 116 and 126 are shown as directly interconnecting parts 6, 102, 112 and 122 of powdering station 2 in FIG. 1. The various parts of these pipes are visible on insert A) of FIGS. 2-4 and are not shown on insert B) of these figures.

Reservoir 102 is equipped with known means per se allowing the fluidizing of coating product coming from pump 112, so that it may be delivered easily and at a controlled rate to the, or each, sprayer(s) 6. To achieve this, reservoir 102 may include a porous plate, not shown, above which coating product from pump 112 is discharged and through which an upwardly directed air flow extends, thereby having the effect of suspending coating product in the air.

In the configuration of feeding unit 10 shown in FIGS. 1 and 2, carton 118 in place on support 120 is arranged on one side of volume V104, being offset, parallel to the X axis, from reservoir 102 and being located below this reservoir, along the Z axis. In this configuration, carton 118 is correctly positioned with respect to bracket 124, being located completely inside volume V104, so that suction tube 122 may plunge into the interior volume of this carton.

In this configuration, carton 118 is relatively difficult to access. In particular, if an operator were to install carton 118 on the support in the configuration shown in FIGS. 1 and 2, he would have to contort himself and work partly in a cantilevered position, unless he were to enter volume V104 himself, where he would be hindered by reservoir 102 and by brackets 103 and 124, against which he could injure himself. By repeating this operation several times per shift, the operator risks premature fatigue and musculoskeletal disorders.

To overcome this difficulty, support 120 may be rotated about an axis Z120, which is vertical and parallel to axis Z in the example shown. Rotation is a simple movement, easy to implement with known means, such as bearings.

Axis Z120 passes through floor 111, so that its portion between floor 111 and ceiling 113 is located within internal volume V104 of casing 104. This makes feeding unit 10 very compact.

Support 120 may thus be moved from the position shown in FIGS. 1 and 2 to that shown in FIG. 3, in which support 120 projects outside volume V104, through opening O104, so that a carton 118 is also arranged at least partially outside volume V104 and is easily accessible to an operator, for loading a carton onto support 120 or unloading a carton from support 120. This position is therefore a position for loading/unloading support 120 with containers which, in this embodiment, are cartons 118.

Movement of support 120 from its transfer position in FIGS. 1 and 2 to its loading/unloading position in FIG. 3 is reversible. It may take place in either direction.

To facilitate work of the operator and rotation of support 120 around axis Z120, support 120 is equipped with two handles 132 and 134 which extend upward from the support, in particular just above a carton in place on the support. Given the geometry, the handles are easily accessible, without the need for the operator to bend. They allow a rotational torque to be exerted on support 120 about axis Z120, without having to bend significantly. This torque may be exerted in the direction of arrow R1 in FIG. 3, to move from the loading/unloading position to the transfer position, or in the direction of arrow R2 in FIG. 2, to move from the transfer position to the loading/unloading position.

Depending on its orientation around axis Z120, support 120 thus assumes a first position for loading/unloading carton 118 onto support 120, which is shown in FIG. 3, and a second position for transferring coating product, which is shown in FIGS. 1 and 2.

This facilitates the work of the operator, as access to support 120 for depositing carton 118 containing powder coating product is made easier in the loading/unloading position shown in FIG. 3, while carton 118 and support 120 do not project outside volume 104 in support 120 transfer position, which is advantageous in terms of safety and in terms of compactness of feeding unit 10, and therefore of powdering station 2.

In practice, the angle of rotation $\alpha$, of support 120, in the anti-trigonometric (clockwise) top view direction shown on insert B) of FIGS. 2 and 3, between its first and second positions may be between 100° and 180°, preferably between 120° and 160°, even more preferably of the order of 135°. Alternatively, the rotation of support 120 between its first and second positions may be performed in the trigonometric (anticlockwise) direction when viewed from above to reach the same point. In this case, the angle of rotation of the support has a value equal to the difference between 360° and the value of the angle in the case of rotation in the anti-trigonometric direction.

Advantageously, a third position is provided for support 120. This third position is shown in FIG. 4. In this third position, carton 118 is located below reservoir 102, allowing the reservoir to be purged by allowing powder coating product contained therein to fall by gravity into carton 118. A purge sleeve valve 105 is provided at the lower part of reservoir 102 and allows control of the discharge of coating product residues present in reservoir 102, through an opening controlled by sleeve valve 105, toward carton 118 in place on support 120 in its third position.

In this third position, in which reservoir 102 is drained, support 120 projects outside casing 104 to a lesser extent than in the loading/unloading position shown in FIG. 3. Carton 118 is not really accessible, but this is not important since, in this configuration, it is not a question of loading or unloading carton 118 onto support 120, but of recovering powder coating product remaining in reservoir 102 and its flowing through the opening controlled by sleeve valve 105.

This third position makes it easier and quicker to drain reservoir 102 and recover coating product remaining in the reservoir, thus facilitating a coating product changeover operation. Indeed, coating product previously used may be recovered in its original carton 118, this carton may be stored until a future powder coating operation during which this product is used. This facilitates coating product changes, particularly color changes.

The third position shown in FIG. 4 is an intermediate position between the first position shown in FIG. 3 and the second position shown in FIGS. 1 and 2, in that, when passing from the first position to the second position with a rotation in the trigonometric direction, and vice versa from the second position to the first position with a rotation in the anti-trigonometric direction, the support 120 passes through the third position.

This third position of support 120 may be reached by support 120, by a rotation in the direction of arrow R1 from the first loading/unloading position, of lesser amplitude than that corresponding to the passage from the first loading/unloading position to the second transfer position, by rotating in the opposite direction, support 120 moves from its third purging position to its first loading/unloading position. This third position of support 120 may also be reached by support 120, by a rotation in the direction of arrow R2 from the second transfer position, of lesser amplitude than that corresponding to the passage from the second transfer position to the first loading/unloading position. A rotation in the opposite direction moves support 120 from its third purge position to its second transfer position.

In practice, the angle of rotation β of support 120, in the trigonometric direction in plan view shown on the insert B) of FIGS. 2 and 4, between its first and third positions may be between 70 and 110°, preferably between 80° and 100°, even more preferably of the order of 90°. Alternatively, the rotation of support 120 between its first and third positions may be performed in the anti-trigonometric direction when viewed from above to reach the same point.

In the above, when an angle is defined as being of the order of a value, it is equal to this value to within 5°.

Whatever the position of support 120, at least one of handles 132 and 134 is accessible to the operator from outside casing 104, through opening O104, in order to exert a torque about axis Z120, in the direction of arrow R1 or in the direction of arrow R2, depending on the desired movement.

In the second embodiment shown in FIGS. 5-8, elements similar to those in the first embodiment bear the same references and are not described in detail. In what follows, if a reference is mentioned in the description without being carried on a figure or if it is carried on a figure without being mentioned in the description, it corresponds to the same element as the one carrying the same reference in the first embodiment. The following description mainly describes what distinguishes the second embodiment from the previous one.

This embodiment differs from the previous one in that a rigid tray 119 is mounted on support 120 to receive a bag of coating product, which corresponds to certain coating product packaging configurations sometimes referred to as "big bag". Tray 119 is preferably made of welded polymer, lacquered steel or polished stainless steel. Container 119 is closed by a cover 139 equipped with a tube 141 which forms a chimney through which a suction tube 122 plunges into container 119, in order to draw up powder coating product sucked by pump 112 through tube 126, in the configuration of FIGS. 5 and 6 where support 120 is in a defined transfer position as in the first embodiment.

Parts 102-116 and 121-134 of powdering station 2 are identical to those of the first embodiment.

Figure 6:
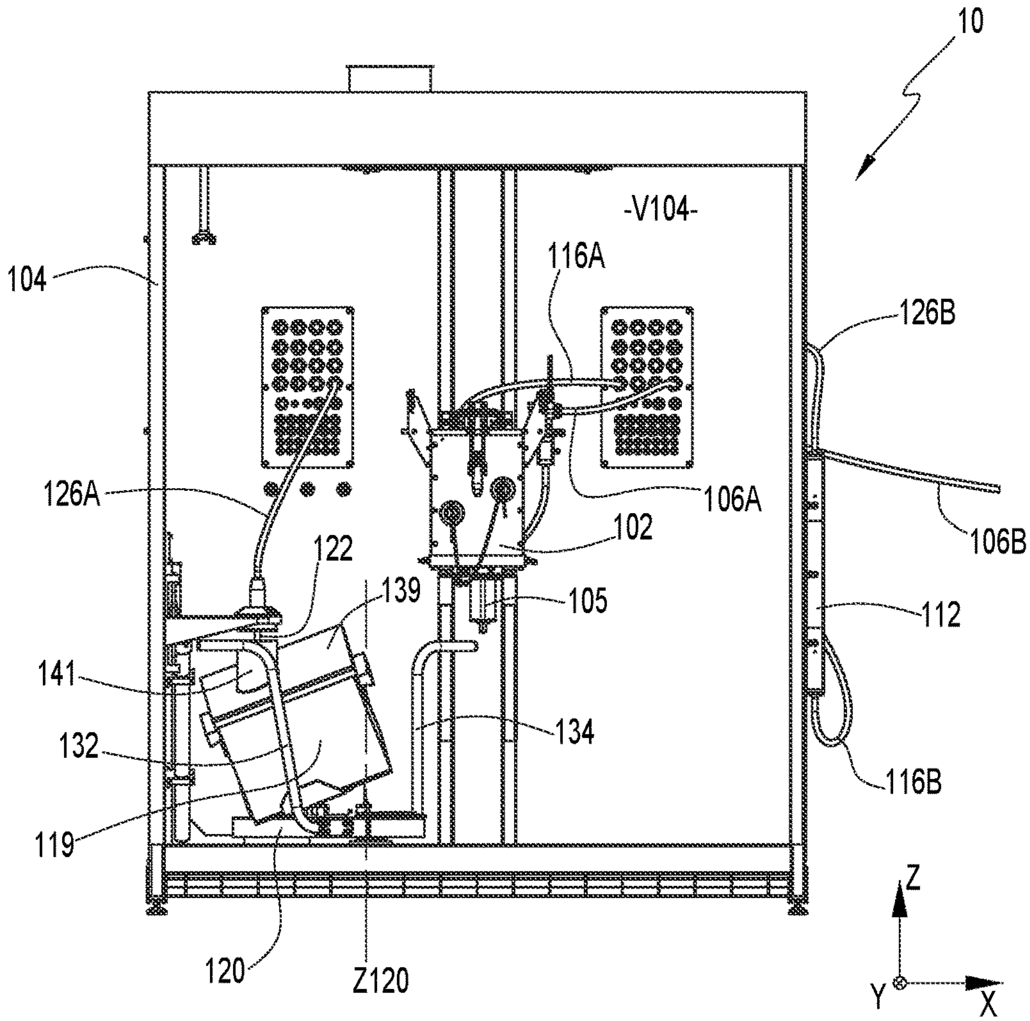
FIG. 6 is a view similar to FIG. 2, for the second embodiment.
Figure 6:
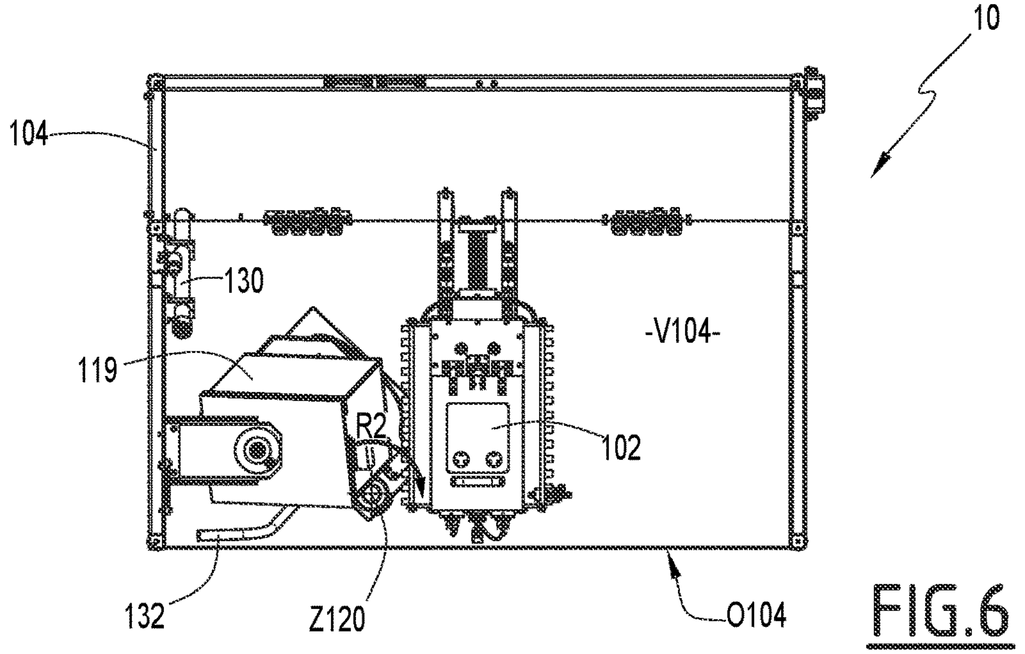
Figure 7:
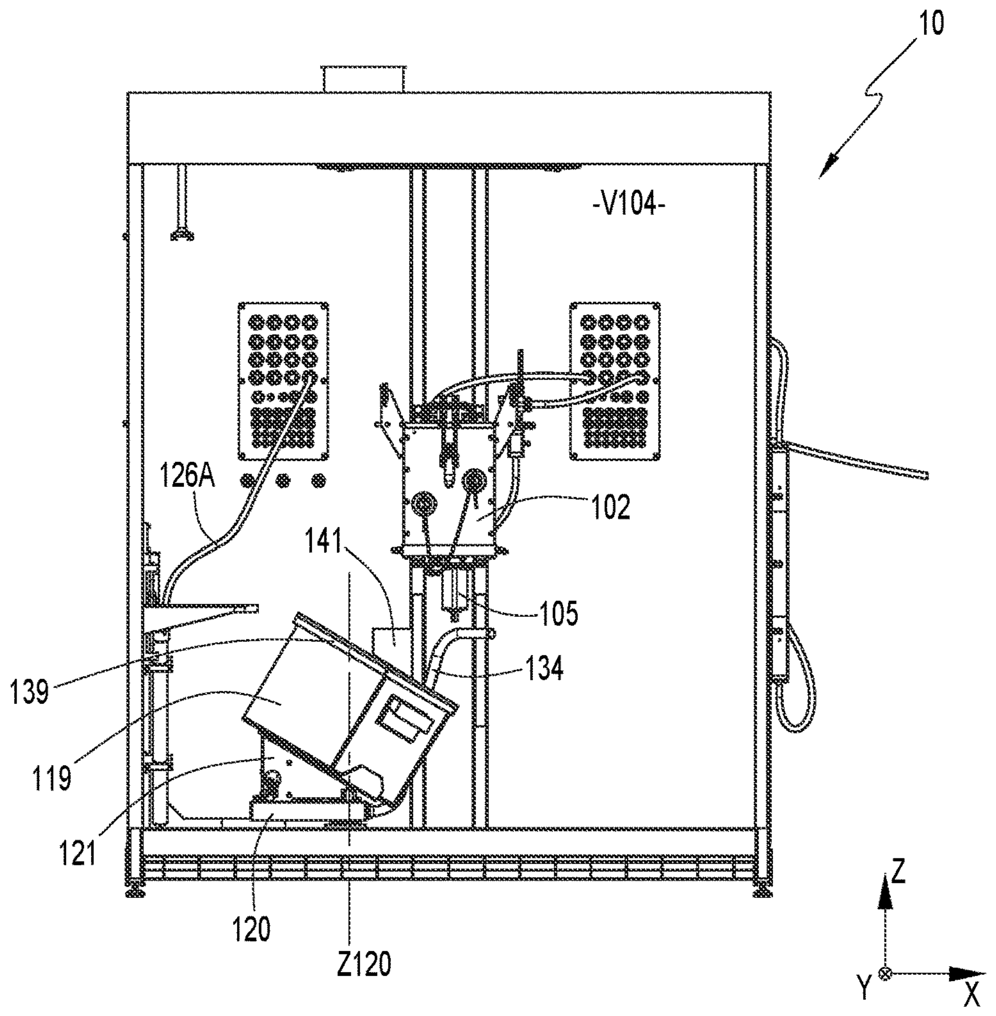
FIG. 7 is a view similar to FIG. 3, for the second embodiment.
Figure 7:
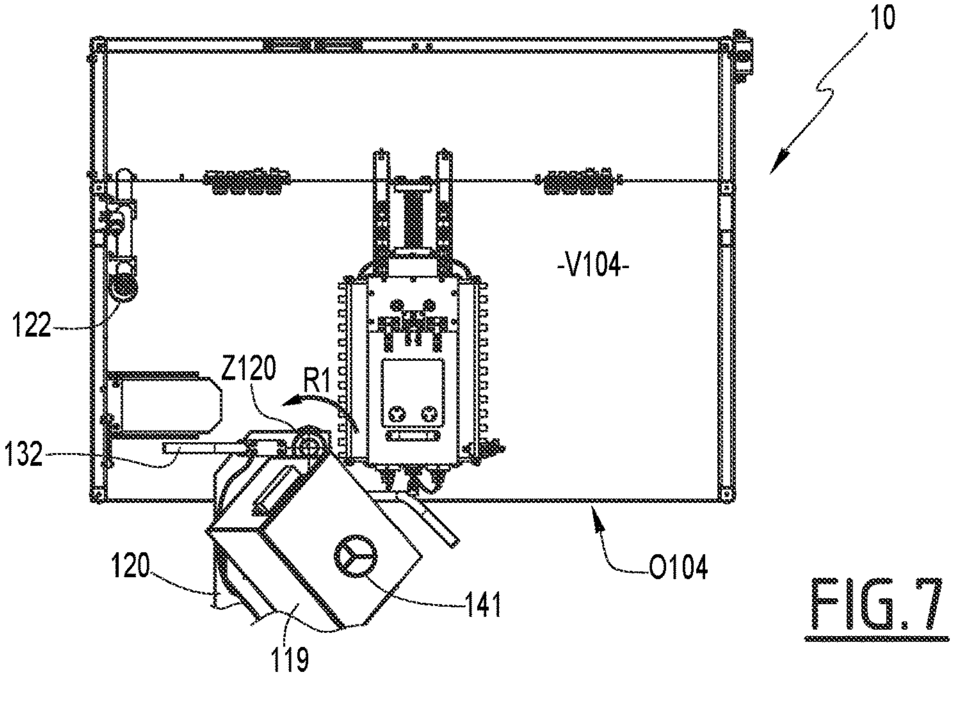

In particular, support 120 is movable in rotation, in the two directions represented by arrows R1 and R2 in FIGS. 7 and 6, respectively, between a first position for loading/unloading a bag of coating product into container 119 and a position for transferring coating product from the internal volume of container 119 to sprayer 6, by passing the fluidized coating product through reservoir 102.

In the first loading/unloading position of support 120 shown in FIG. 7, and according to an aspect not shown, cover 139 is removed before a partially or fully used bag of coating product is removed and before a new bag of coating product is placed in rigid tray 119. After this operation, cover 139 is replaced on container 119, still in this position.

Cover 139 and tube 141 allow the interior volume of container 119 to be confined. This prevents powder coating product from being deposited on the inside of feeding unit 10, thereby limiting the risk of pollution of powder coating product by external particles.

Figure 5:
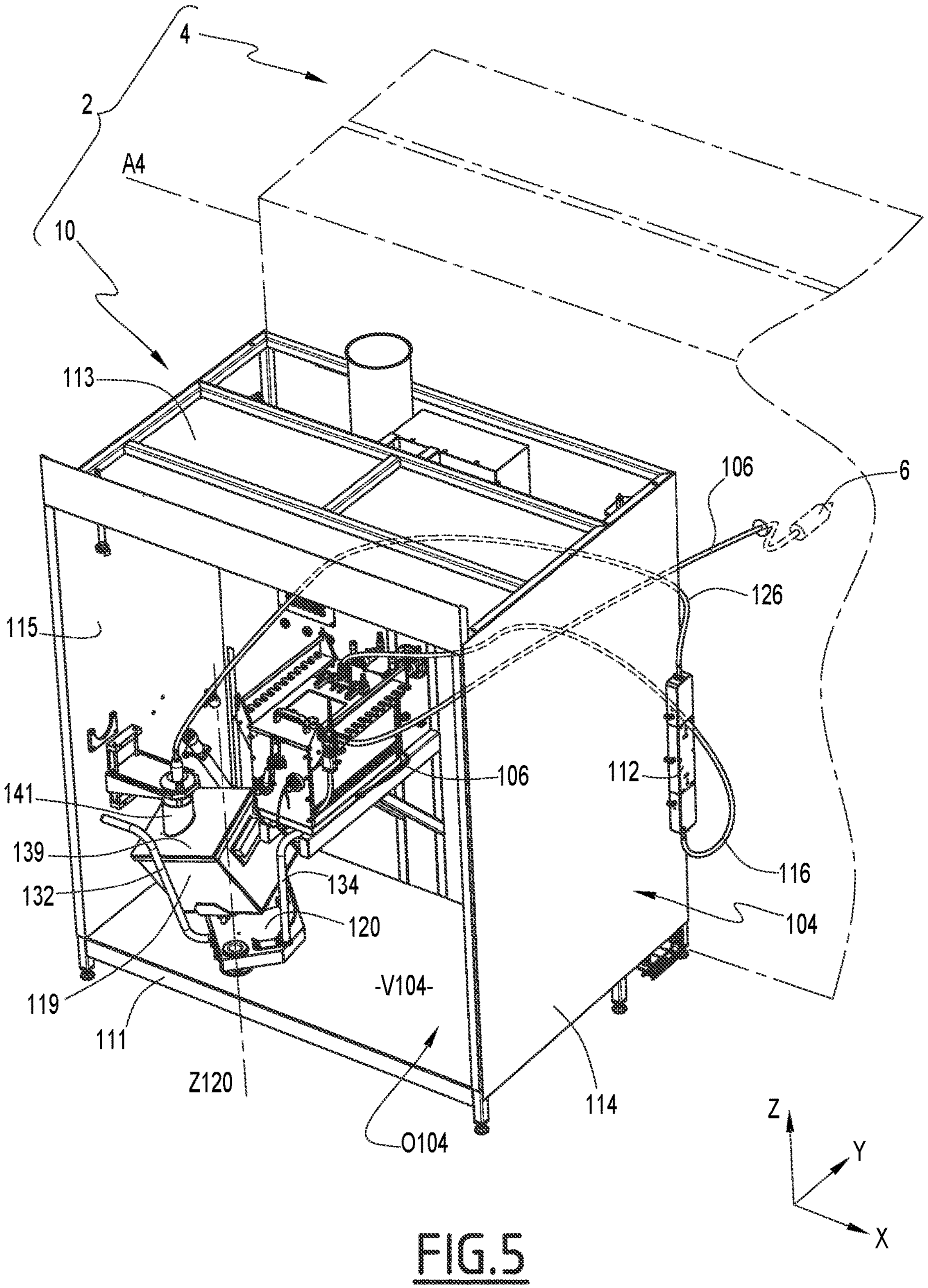
FIG. 5 is a view similar to FIG. 1, for an installation and a feeding unit in accordance with a second embodiment of the invention.
Figure 8:
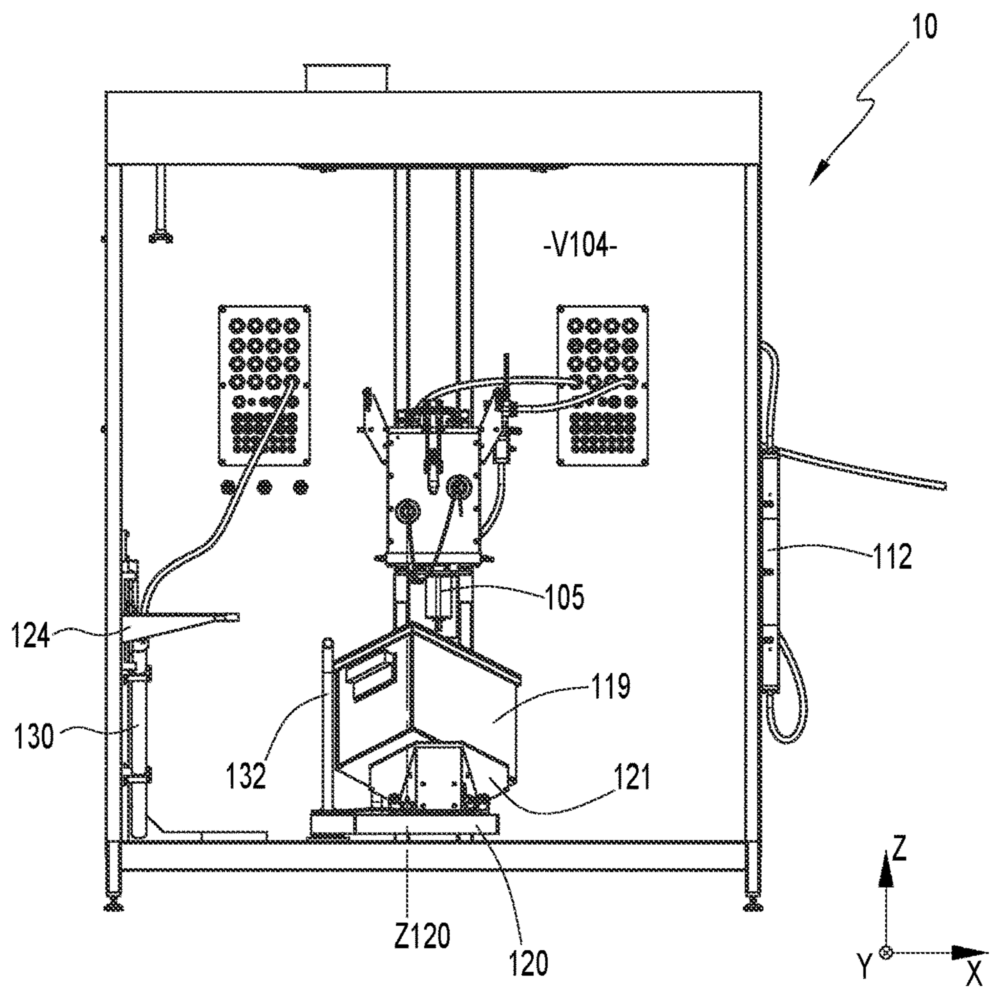
FIG. 8 is a view similar to FIG. 4, for the second embodiment.
Figure 8:
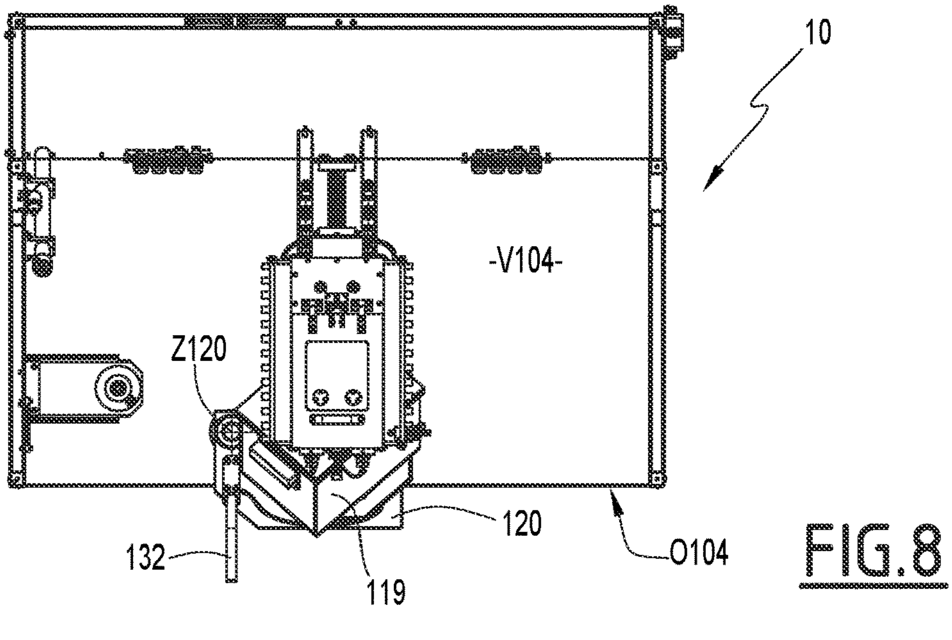

Tube 141 is positioned on cover 139 so that it is aligned with suction tube 122 in the second transfer position shown in FIGS. 5 and 6, as well as with the outlet opening of reservoir 102 controlled by sleeve valve 105, in the third configuration shown in FIG. 8, which is optional as in the first embodiment.

In this third position, tube 141 assures that coating product is guided toward the interior volume of reservoir 119 and limits risk of pollution of volume V104.

Whatever the embodiment, the number of handles 132, 134 or equivalent fitted on support 120 to apply a torque between its above-mentioned positions may be different from two, in particular equal to one or greater than or equal to three. In addition, these handles may have a different geometry to that shown in the figures.

Alternatively, casing 104 may have a different geometry to that shown in the figures, and its opening may be oriented differently.

Alternatively, the movement of the support between its first and second positions, and possibly between these positions and the third position, is a circular movement in translation, about two axes of rotation. In this case, the angle of rotation between the different positions is limited to 180°.

Whether using movement in rotation or circular translation, the displacement of the support between its positions is well controlled and does not encumber the space outside the casing 104, as would be the case with movement in translation.

According to another alternative, not shown, applicable to a movement in rotation or circular in translation, means are provided for indexing, in other words, stopping, the support in each of its first and second positions, and possibly in its third position.

According to yet another alternative (not shown), support 120 is driven electrically, by a motor, or pneumatically, by a rotary actuator, between its positions. In this case, handles 132 and 134 may be omitted.

The invention is not limited to the embodiments described. In particular, the embodiments and alternatives envisaged above can be combined with one another.

What is claimed is:

1. A feeding unit for a powdering station, of powder coating product, the feeding unit comprising:

a fluidized coating product reservoir;

a support for receiving a container of coating product;

a pump for feeding said fluidized coating product reservoir from the container carried by said support; and a casing which defines an internal volume for receiving said fluidized coating product reservoir and which is provided with an access opening for access to the internal volume, wherein said support is movable in rotation or circular translation in clockwise and counter-clockwise directions, about at least one axis of rotation, at least between:

a first loading/unloading position, wherein said support projects outside the internal volume of said casing, through the access opening, and a second coating transfer position, wherein said support and the container in place on said support are included in the internal volume of said casing.

2. The feeding unit according to claim 1, wherein the axis of rotation is vertical.

3. The feeding unit according to claim 2, wherein the axis of rotation is arranged, in part, within the internal volume of said casing.

4. The feeding unit according to claim 1, wherein said support is equipped with a vibrating table.

5. The feeding unit according to claim 1, wherein said support is movable in rotation or circular translation from one of the first loading/unloading and the second coating transfer positions toward a third position for purging said fluidized coating product reservoir, and vice versa from the third position toward one of the first loading/unloading and second coating transfer positions.

6. The feeding unit according to claim 5, wherein, in the third position of the support, the coating product container is arranged below said fluidized coating product reservoir.

7. The feeding unit according to claim 1, wherein an angle of rotation of said support between the first loading/unloading position and the second coating transfer position is between 100° and 180°.

8. The feeding unit according to claim 7, wherein the angle of rotation of said support between the first loading/unloading position and the second coating transfer position is between 120° and 160°.

9. The feeding unit according to claim 8, wherein the angle of rotation of said support between the first loading/unloading position and the second coating transfer position is of the order of 135°.

10. The feeding unit according to claim 7, wherein the angle of rotation of said support, between the first loading/unloading position and a third position is between 70° and 110°.

11. The feeding unit according to claim 10, wherein the angle of rotation of said support, between the first loading/unloading position and the third position is between 80° and 100°.

12. The feeding unit according to claim 11, wherein the angle of rotation of said support, between the first loading/unloading position and the third position is of the order of 90°.

13. The feeding unit according to claim 1, wherein the container is equipped with a cover provided with a tube for the passage of a coating product suction tube when said support is in the second coating transfer position, and wherein the tube is arranged below an opening for emptying said fluidized coating product reservoir when said support is in a third position for purging said fluidized coating product reservoir.

14. The feeding unit according to claim 1, wherein said support is equipped with at least one handle for moving said support in rotation between the first loading/unloading position and the second coating transfer position.

15. The feeding unit according to claim 14, wherein said support is equipped with at least one handle for moving said support in rotation between the first loading/unloading position and the second coating transfer and a third position for purging said fluidized coating product reservoir.

16. The feeding unit according to claim 1 wherein said support is configured to receive containers of the tray type or of the carton type.

17. The feeding unit according to claim 16 wherein said support is configured to receive a rigid tray for a bag of coating product.

18. A powdering station comprising at least one powder coating product sprayer installed in a spray booth and supplied with coating product by a supply unit, wherein the supply unit is according to claim 1.

* * * * *